(12) United States Patent
Kivijärvi

(10) Patent No.: US 7,020,481 B2
(45) Date of Patent: Mar. 28, 2006

(54) TRANSMITTING CONNECTION SET-UP PARAMETERS IN PACKET DATA NETWORK

(75) Inventor: Jukka Kivijärvi, Lempäälä (FI)

(73) Assignee: Nokia Corporation, Espoo (FI)

( * ) Notice: Subject to any disclaimer, the term of this patent is extended or adjusted under 35 U.S.C. 154(b) by 436 days.

(21) Appl. No.: 10/156,883

(22) Filed: May 28, 2002

(65) Prior Publication Data

US 2002/0187800 A1 Dec. 12, 2002

(30) Foreign Application Priority Data

May 28, 2001 (FI) ................................ 20011111

(51) Int. Cl.
H04Q 7/20 (2006.01)

(52) U.S. Cl. ...................... 455/515; 455/509

(58) Field of Classification Search .............. 455/434, 455/435.1, 445, 426.1, 452.2, 515, 509, 517, 455/450, 521

See application file for complete search history.

(56) References Cited

U.S. PATENT DOCUMENTS

| | | | |
|---|---|---|---|
| 5,987,322 A | 11/1999 | Gupta et al. ............. | 455/432 |
| 6,016,428 A * | 1/2000 | Diachina et al. ......... | 455/435.1 |
| 6,374,112 B1 * | 4/2002 | Widegren et al. ........ | 455/452.2 |
| 6,480,717 B1 * | 11/2002 | Ramaswamy .............. | 455/445 |
| 6,625,461 B1 * | 9/2003 | Bertacchi ................ | 455/466 |
| 6,665,280 B1 * | 12/2003 | Forssell et al. ........... | 370/329 |
| 6,678,524 B1 * | 1/2004 | Hansson et al. ........... | 455/445 |
| 6,714,781 B1 * | 3/2004 | Pecen et al. ............. | 455/426.1 |

FOREIGN PATENT DOCUMENTS

| | | |
|---|---|---|
| EP | 0967740 A1 | 12/1999 |
| EP | 1098541 A1 | 5/2001 |
| WO | WO 98/32265 | 7/1998 |
| WO | WO 01/65881 | 9/2001 |

OTHER PUBLICATIONS

3GPP TS 24.008, v3.7.1, para. 10.5.5.12a "MS Radio Access Capability".
3GPP TS 04.18, V8.9.0 para. 10.5.2.37b "SI 13" Rest Octet.
3GPP TS 04.60 (relevant chapters 5.5.2.1.2 and 5.5.2.2.).
3GPP TS 04.08.

* cited by examiner

Primary Examiner—Edan Orgad
Assistant Examiner—Michael Chu
(74) Attorney, Agent, or Firm—Perman & Green, LLP

(57) ABSTRACT

A method for transmitting connection set-up parameters of a packet data network on broadcast control channels in a telecommunications system, which comprises at least one cell, which uses a circuit-switched and a packet-switched broadcast/common control channel. At least one mobile station supports the packet data network and is arranged to listen to at least one of said broadcast/common control channels. The connection set-up parameters of the packet data network are transmitted to mobile stations in the cell on both broadcast control channels, if the cell supports the transmission of the connection set-up parameters of the packet data network on both broadcast control channels. The mobile station transmits to the packet data network a DCCM indication, if the mobile station is capable of receiving control messages on both common control channels, and the telecommunications system is directed to transmit control messages to the mobile station on one of the common control channels.

8 Claims, 3 Drawing Sheets

```
< SI 13 Rest Octets > ::=
        { L | H
        < BCCH_CHANGE_MARK : bit (3) >
        < SI_CHANGE_FIELD : bit (4) >

{ 0 | 1     < SI13_CHANGE_MARK : bit (2) >
                    < GPRS Mobile Allocation : GPRS Mobile Allocation IE > }-- Defined in 3GPP TS 04.60

{ 0                                             -- PBCCH not present in cell :
                    < RAC : bit (8) >
                    < SPGC_CCCH_SUP : bit >
                    < PRIORITY_ACCESS_THR : bit (3) >
                    < NETWORK_CONTROL_ORDER : bit (2) >
                    < GPRS Cell Options : GPRS Cell Options IE >  -- Defined in 3GPP TS 04.60
                    < GPRS Power Control Parameters : GPRS Power Control Parameters struct >

| 1                                             -- PBCCH present in cell :
                    < PSI1_REPEAT_PERIOD : bit (4) >
                    < PBCCH Description : PBCCH Description struct >
                }
                { null | L                  -- Receiver compatible with ealier release
                | H
                                            -- Additions in release 99
                { 0 | 1 < PSI1_REPEAT_PERIOD : bit (4) >
                < PBCCH Description : PBCCH Description struct > }
                < SGSNR : bit > }
        }
        < spare padding > ;

< GPRS Power Control Parameters struct > ::=
        < ALPHA : bit (4) >
        < T_AVG_W : bit (5) >
        < T_AVG_T : bit (5) >
        < PC_MEAS_CHAN : bit >
        < N_AVG_I : bit (4) >;

< PBCCH Description struct > ::=
        <Pb : bit (4) >
        < TSC : bit (3) >
        < TN : bit (3) >
        { 00           -- BCCH carrier
        | 01           < ARFCN : bit (10) >
        | 1                         < MAIO : bit (6) >} ;
```

Fig. 2

| |
|---|
| < MS Radio Access capability IE > ::= |
| <MS Radio Access capability IEI :  00100100 > |
| <Length of MS RA capability: <octet>> |
| <MS RA capability value part : < MS RA capability value part struct >> |
| <spare bits>**; |
| |
| <MS RA capability value part struct >::= |
| < Access Technology Type: bit (4) > |
| < Access capabilities : <Access capabilities struct> > |
| { 0 \| 1 <MS RA capability value part struct> } ; |
| |
| < Access capabilities struct > ::= |
|    < Length : bit (7) > |
|    <Access capabilities : <Content>> |
|    <spare bits>** ; < Content > ::= |
| |
| < RF Power Capability : bit (3) > |
|    { 0 \| 1 <A5 bits : <A5 bits> > } |
| |
|    < ES IND : bit > |
|    < PS : bit > |
|    < VGCS : bit > |
|    < VBS : bit > |
|    { 0 \| 1 < Multislot capability : Multislot capability struct > } |
|    { 0 \| 1 < 8PSK Power Capability : bit(2) >} -- |
|    < COMPACT Interference Measurement Capability : bit > |
|    < Revision Level Indicator : bit > |
|    < DCCM PCCCH Capability : bit > |
|    < UMTS FDD Radio Access Technology Capability : bit > |
|    < UMTS TDD Radio Access Technology Capability : bit > |
|    < CDMA 2000 Radio Access Technology Capability : bit >; |

Fig. 4

TRANSMITTING CONNECTION SET-UP PARAMETERS IN PACKET DATA NETWORK

FIELD OF THE INVENTION

The invention relates to packet data services of wireless telecommunications systems and especially to transmitting connection set-up parameters on broadcast control channels.

BACKGROUND OF THE INVENTION

The progress in wireless data transmission has more and more brought forth the need to transmit wirelessly not only calls but also different data applications. The circuit-switched connections used conventionally in mobile systems are, however, rather poorly suited for transmitting different burst-type data services, which is why packet-switched applications have also been developed for mobile systems. During the past few years, GSM 2+ phase standards, in which the new packet-switched data transmission service GPRS (General Packet Radio Service) is also defined, have been drafted for the European digital GSM (Global System for Mobile communication) mobile network, for instance. GPRS is a packet radio network utilizing the GSM network, which endeavors to optimize data packet transmission by means of GPRS protocol layers on the air interface between a mobile station and a GPRS network.

The GSM system comprises several different, typically unidirectional control channels, by means of which the network controls the operation of mobile stations. One such channel is the broadcast control channel BCCH, through which information is transmitted on the different cells of the network, such as identification information of the cell, identification information on the network, frequencies used in the cell, etc. Each base transceiver station BTS transmits information on a cell on a broadcast control channel of its own, to which all mobile stations in the area of the cell listen.

Correspondingly, specific control channels have also been designed for the GPRS system, one of which is the packet broadcast control channel PBCCH, whose task is to transmit system information to all GPRS mobile stations in the cell; just like BCCH does in the GSM network. When a GPRS mobile station is in idle mode, no data transmission resources have been allocated to it and it only listens to the broadcast control channel BCCH and the paging control channel PCH of the cell, or to the packet broadcast control channel PBCCH and the packet paging control channel PPCH, if the cell supports this GPRS control channel. If the cell does not support this PBCCH channel, which will be a very common situation when GPRS networks will be built on top of the GSM network, the GPRS mobile station listens to the GSM broadcast control channel BCCH. The used broadcast control channel, PBCCH or BCCH, is thus defined according to which broadcast control channel is available at each time in the cell of the GPRS mobile station.

A GPRS mobile station should thus support broadcast control channel reception on both the PBCCH channel and the BCCH channel. Then, if the cell uses the PBCCH channel, the network transmits the parameters used in the GPRS network to the mobile stations on said PBCCH channel only.

A problem with the arrangement described above is that if the GPRS mobile station cannot correctly receive system information transmitted on the PBCCH channel, it also cannot transmit or receive data packet transmissions according to GPRS. In the near future, when GSM networks will be updated to also support GPRS packet data services, a great risk exists that GPRS mobile stations which came out on the market before the PBCCH channel came to the networks will not work on the PBCCH channels to be built into the networks in the future, because it has not been possible to test them in field conditions. Thus, there also exists a great risk that GPRS mobile stations which came out on the market before the GPRS service was initiated will not work in the GPRS network after the PBCCH channels are taken into use in the new networks. The extremely significant drawback in this is that circuit-switched speech services will not work, either, in such GPRS mobile stations.

BRIEF DESCRIPTION OF THE INVENTION

It is thus an object of the invention to develop a method and an apparatus implementing the method so as to solve the above-mentioned problems. The object of the invention is achieved by a method and system which are characterized by what is stated in the independent claims. Preferred embodiments of the invention are set forth in the dependent claims.

The invention is based on the idea that if a cell supports the GPRS service on both BCCH and PBCCH channels, the network is configured to transmit the parameters required in a GPRS connection to GPRS mobile stations on both broadcast control channels. Such GPRS mobile stations that do not work on PBCCH channels to be built into the network, continue broadcast control channel reception only on the BCCH channel and paging reception on the PCH channel and receive through them the parameters required for using the GPRS service in spite of the fact that the cell may simultaneously also use a packet broadcast control channel PBCCH.

A situation as described above, in which the GPRS connection set-up parameters are transmitted on both broadcast control channels and which can be called by the term DCCM (Dual Control Channel Mode) operating mode, does, however, cause an additional problem in that the network should know how to define the other control channels used on each mobile station, especially the common control channel, so that all control commands required for using the GPRS service can be transmitted correctly.

This additional problem is solved by having the GPRS mobile station, which is in the DCCH cell and supports the DCCH operating mode, indicate separately to the network, after having received the connection set-up parameters, which common control channel, the circuit-switched or the packet-switched, it is capable of using, and in response to this, the network can allocate the appropriate traffic and broadcast control channels for each mobile station and correspondingly transmit the control messages on the correct channels.

The method and system of the invention provide the advantage that it is possible to ensure the operation of GPRS mobile stations that come out on the market before the PBCCH channel will be taken in to use, in cells which use a PBCCH channel. A further advantage is that it is also possible to ensure that GPRS mobile stations to be developed later will also be capable of broadcast control channel reception on the PBCCH channel. A yet further advantage is that mobile stations using circuit-switched and packet-switched common control channels can easily be separated to different traffic channels, thus making sure that those operating on circuit-switched common control channels do not receive control messages belonging to packet-switched control channels.

BRIEF DESCRIPTION OF THE FIGURES

In the following, the invention will be described by means of preferred embodiments and with reference to the attached drawings, in which FIG. 2 shows a message according to a preferred embodiment of the invention, FIG. 4 shows a message according to a preferred embodiment of the invention.

DETAILED DESCRIPTION OF THE INVENTION

In the following; the invention will be described by way of example based on the GSM/GPRS system. The invention is, however, not limited to the GSM/GPRS system, but can, for instance, be applied to what is known as the third-generation mobile system UMTS (Universal Mobile Telecommunication System) which comprises functions corresponding to the GPRS system and whose mobile stations should also support the data transmission of the GSM/GPRS system.

Figure 1:
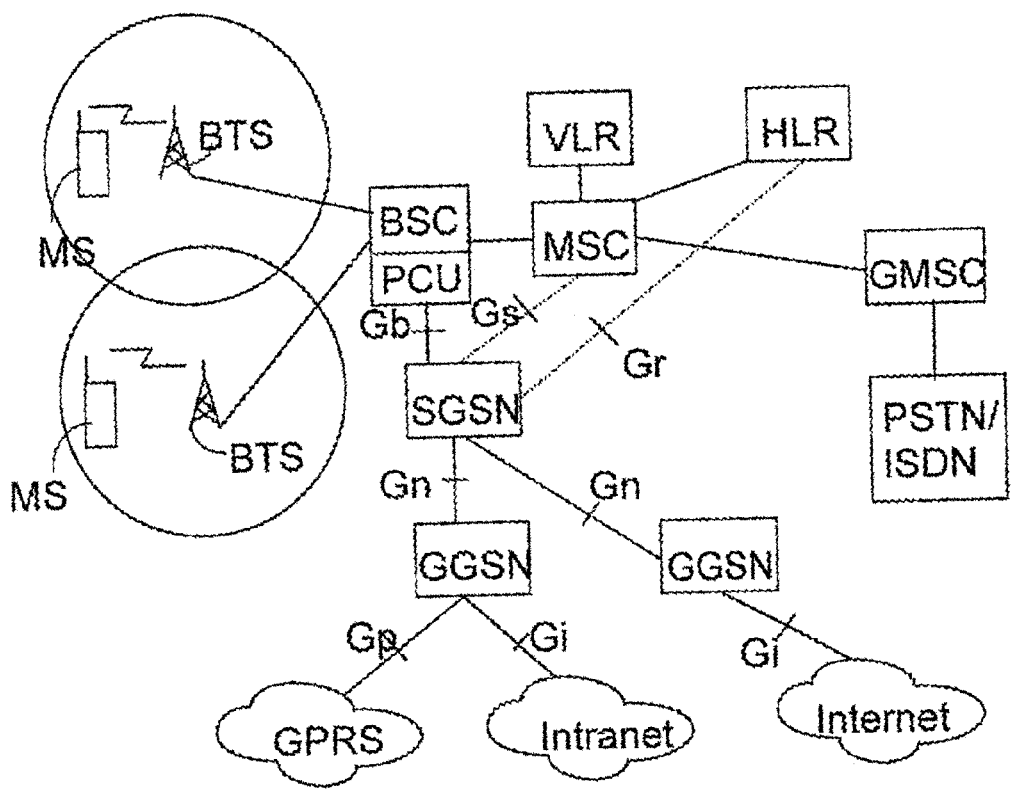
FIG. 1 shows a block diagram of the structure of the GSM/GPRS system.

FIG. 1 illustrates how the GPRS system is built on the GSM system. The GSM system comprises mobile stations (MS) which have a radio connection to base transceiver stations (BTS). Several base transceiver stations BTS are connected to a base station controller (BSC) which controls the radio frequencies and channels available to them. The base station controller BSC and the base transceiver stations BTS connected to it form a base station subsystem (BSS). The base station controllers BSC are connected to a mobile services switching center (MSC) which takes care of connection establishment and call routing to correct addresses. In this, two databases containing information on mobile subscribers are used: a home location register (HLR) which contains information on all subscribers in the mobile network and the services they subscribe to, and a visitor location register (VLR) which contains information on mobile stations visiting the area of a given mobile services switching center MSC. The mobile services switching center MSC is, in turn, connected to other mobile services switching centers through a gateway mobile services switching center (GMSC) and to a public switched telephone network (PSTN). For a more detailed description of the GSM system, reference is made to the ETSI/GSM specifications and the book *The GSM system for Mobile Communications*, M. Mouly and M. Pautet, Palaiseau, France, 1992, ISBN:2-957190-07-7.

The GPRS system connected to the GSM system comprises two nearly independent functions, i.e. a gateway GPRS support node GGSN and a serving GPRS support node SGSN. The GPRS network can comprise several gateway and serving support nodes, and typically, several serving support nodes SGSN are connected to one gateway support node GGSN. Both support nodes, SGSN and GGSN, act as routers which support the mobility of the mobile station, control the mobile system and route data packets to the mobile stations regardless of their location and the used protocol. The serving support node SGSN is connected to the mobile station MS through the mobile network. The connection to the mobile network (interface Gb) is typically established through a base station controller BSC which typically comprises a packet control unit PCU, which creates the function required by the interface Gb in the base station controller BSC and controls the transmission of data packets onwards from the base station controller. A task of the serving support node SGSN is to detect mobile stations capable of GPRS connections in its service area, to transmit and receive data packets from said mobile stations and to monitor the location of mobile stations in its service area. The user data of all GPRS mobile stations in the service area of the serving support node SGSN thus goes through said serving support node. Further, the serving support node SGSN is connected to a short message switching center SMS-GSMC for incoming short messages through an interface Gd, and to the home location register HLR through an interface Gr, and possibly to the mobile switching center MSC and the visitor location register VLR through a signaling interface Gs. GPRS records comprising the contents of subscriber-specific packet data protocols are also stored in the home location register HLR.

The gateway support node GGSN acts as a gateway between the GPRS network and an external packet data network PDN. External packet data networks include the GPRS network of another network operator or the Internet. The gateway support node GGSN is connected to said packet data networks through interfaces Gp (another GPRS network) and Gi (other PDNs). Private local area networks are typically connected to one of said packet data networks through a router. Data packets transmitted between the gateway support node GGSN and the serving support node SGSN are always encapsulated according to the GPRS standard. The gateway support node GGSN also contains PDP (Packet Data Protocol) addresses and routing information, i.e. SGSN addresses, of the GPRS mobile stations. The routing information is used to link data packets between an external data packet network and the serving support node SGSN. The GPRS backbone network between the gateway support node GGSN and the serving support node SGSN is a network utilizing the IP protocol, either IPv4 or IPv6 (Internet Protocol, version 4/6).

The GSM system comprises several different, typically unidirectional control channels, by means of which the network controls the operation of mobile stations. One of these is the broadcast control channel BCCH, through which information on the different cells of the network, such as cell identification information, network identification information, frequencies used in the cell, etc., are transmitted. Each base transceiver station BTS transmits the cell information on its own broadcast control channel, to which all mobile stations in the area of the cell listen. Further, one control channel is a common control channel CCCH. CCCH can be divided into three logical channels: a paging channel PCH, an access grant channel AGCH and a random access channel RACH. Paging messages to mobile stations, for instance in connection with a call set-up initiated by the network, are transmitted on the paging channel PCH, and on the access grant channel AGCH the base transceiver station allocates to a mobile station an SDCCH channel for the allocation of a traffic channel to be used in a call. The structures of the paging channel PCH and the access grant channel AGCH are alike and the channels are used in turn according to a certain scheme, i.e. never simultaneously. Said control channels are allocated time division frames together with other logical control channels from the same control channel multiframe structure, to which different control channels are thus multiplexed as certain channel combinations.

The GPRS system correspondingly has its own packet broadcast control channel PBCCH and packet common control channel PCCCH. The task of the packet broadcast control channel PBCCH is to transmit system information to all GPRS mobile stations in the cell. Similar to the GSM common channel CCCH, the packet common control channel PCCCH comprises several logical control channels. These include a packet paging channel PPCH, packet access grant channel PAGCH and packet notification channel PNCH in the downlink direction (from the base transceiver station to the mobile station), and a packet random access channel PRACH in the uplink direction (from the mobile station to the base transceiver station). The packet paging channel PPCH is used to transmit paging messages to mobile stations before beginning a data packet transfer, if the location of the mobile station is not know at an accuracy of a cell. On the packet access grant channel PAGCH, a mobile station is allocated the channel resources available for transfer before beginning a data packet transfer. The packet notification channel PNCH is used to allocate resources for a point-to-multipoint (PTM) message before the PTM message is transmitted to a certain GPRS mobile station group.

When a GPRS mobile station is in packet-idle mode, no data transmission resources are allocated to it on the traffic channels and it only listens to the packet broadcast control channel PBCCH and packet paging channel PPCH of the cell, if the cell supports these GPRS control channels. If the cell in question does not support these GPRS control channels, said mobile station listens to the GSM control channels BCCH and PCH. The broadcast control channel to be used, PBCCH or BCCH, is thus determined by which broadcast control channel is available at each time in the cell of the GPRS mobile station.

If the packet broadcast control channel PBCCH is used, the network transmits on the PBCCH channel at regular intervals PSI (packet system information) messages which the GPRS mobile station receives regularly. Different types of PSI messages, such as 1, 2, 3, 3bis, 4 and 5, are used on the PBCCH channel. A PSI1 message can also be transmitted on the PPCH channel. From the PSI messages of the PBCCH channel, the mobile station MS can deduce, whether it can set up a packet data link in the cell in question and what parameters it should use to set up the connection and to operate in the cell. The most important one of these messages is the PSI1 message, by means of which the network notifies what the situation is at each time concerning packet data service support and what the sequencing of the PSI messages to be transmitted is. The PSI1 message comprises parameters PBCCH_CHANGE_MARK and PSI_CHANGE_FIELD, by means of which changes occurred in the content and deletions/additions of the PSI messages can be updated in such a manner that by increasing the parameter values in connection with the changes, the mobile stations are directed to update from the network the changed PBCCH values. This way, it is possible to force all mobile stations in the cell to update their PBCCH information at the same time.

The broadcast control channel BCCH can be used when the PBCCH channels is not available in the cell in question or when it is necessary to ensure connection to the network in a situation in which PBCCH is removed for some reason or its location in the cell changes. A mobile station then listens on the BCCH channel to SI (system information) messages at regular intervals, and especially to the SI13 message which enables the transmission of the necessary GPRS parameters to mobile stations. The parameters are then transmitted that are required for setting up a GPRS connection in a cell which has no PBCCH channel. If the cell in question does not support PBCCH, it is possible by means of the parameter BCCH_CHANGE_MARK in the SI13 message to update the changes occurred in the content of the SI messages and to force all mobile stations in the cell to update their BCCH information at the same time.

A GPRS mobile station should thus support broadcast control channel reception on both the PBCCH channel and the BCCH channel. In accordance with the above, if the cell uses the PBCCH channel, the network transmits the parameters to be used in a GPRS connection to the mobile stations only on said PBCCH channel. On the other hand, if the GPRS mobile station cannot receive correctly system information transmitted on the PBCCH channel, neither can it transmit or receive a data packet transmission according to GPRS. In such a case, using voice services may also be prevented. When the updating of GSM networks is started in the near future so as to make them also support the GPRS packet data service, but only on the BCCH and CCCH channels, a very high risk exists that GPRS mobile stations which came out on the market at the initial stage of the GPRS service will not work on the PBCCH channels to be built later into the network, since it has not been possible to test them in field conditions.

This can be avoided in such a manner that if a cell supports the GPRS service on both the BCCH channel and the PBCCH channel, the network is directed to transmit the parameters needed for a GPRS connection to GPRS mobile stations on both broadcast control channels. The GPRS mobile stations which do not work on PBCCH channels to be built in the network then continue broadcast control channel reception on the BCCH channel only and paging message reception on the PCH channel, and through them obtain the parameters required for using the GPRS service in spite of the fact that the cell may simultaneously also use the packet broadcast control channel PBCCH. All parameters related to the GPRS service are transmitted on the BCCH channel as if the PBCCH channel was not at all in use. On the other hand, the GPRS mobile stations to be developed later will also be capable of broadcast control channel reception on the PBCCH channel and packet paging message reception on the PPCH channel. This property, in which the network is capable of transmitting control commands related to connection set-up parameters of a packet data service on both circuit-switched and packet-switched control channels can be referred to by the term DCCM (dual control channel mode), for instance. This way, the PBCCH channels can be taken into use in GPRS networks as soon as network manufacturers can supply them, while at the same time making sure that that the GPRS mobile stations on the market now still work. The mobile stations which can change over to receiving the connection set-up parameters of a packet data service on the PBCCH channel, even though the network also transmits them on the BCCH channel, and change over to listening to the PPCH channel, can be called DCCM mobile stations. Mobile network cells, in which the parameters related to the GPRS service are transmitted on both the BCCH channel and the PBCCH channel, can correspondingly be called DCCM cells.

According to a preferred embodiment of the invention, this DCCM function can be implemented by means of the SI13 message transmitted on the BCCH channel. As shown in FIG. 2, the SI13 message comprises first a 3-bit BCCH_CHANGE_MARK field and after it a 4-bit SI_CHANGE_FIELD field. The next bit indicates whether an SI13_CHANGE_MARK field and channel allocation information (GPRS mobile allocation) are transmitted in this message. The next bit is used to indicate the broadcast control channels supported by the cell. The bit value 0 then indicates that the cell does not use the packet broadcast control channel PBCCH and the GPRS parameters are only transmitted on the BCCH channel by means of the information fields RAC, SPGC_CCCH_SUP, PRIORITY_ACCESS_THR, NETWORK_CONTROL_ORDER, GPRS Cell Options and GPRS Power Control Parameters. The operation of these information fields is not, however, essential for the implementation of the invention and they are described in greater detail in the document 3GPP TS 04.18, V8.9.0, paragraph 10.5.2.37b "SI 13 Rest Octets."

The bit value 1 is used to indicate that the GPRS parameters are transmitted in the cell on PBCCH channel only. The parameters are transmitted by defining the repetition period of the PSI1 message and the structure of the used PBCCH channel.

Supporting the DCCM operating mode of a cell, in other words, transmitting the GPRS parameters on both the BCCH channel and the PBCCH channel, can now be arranged by first setting the value of said bit to zero, which indicates that the GPRS parameters are transmitted on the BCCH channel. In addition to this, a new data structure (marked in bold in FIG. 2) is added to the extension part of the message, the data structure being one that only the GPRS mobile stations which will come out on the market later on can read and in which the network transmits the PBCCH parameters, i.e. information that the PBCCH/PCCCH channels are also in use in the cell in question, and information on where the PBCCH channel can be found. Such GPRS mobile stations that do not work on the PBCCH channels to be built into the network then perform broadcast control channel reception on the BCCH channel only and listen to paging messages on the PCH channel in spite of the fact that the cell also uses the packet broadcast control channel PBCCH simultaneously. This means that network operators can take PBCCH channels into use in GPRS networks as soon as network manufacturers can supply them.

Thus, by modifying the content of the SI13 message described above, a network operator can separately define the use of the BCCH and PBCCH broadcast control channels in transmitting the GPRS parameters. In the future, when the network operator is convinced that substantially all mobile stations in the network operate on the PBCCH channels, the GPRS parameters can then be transmitted on the PBCCH channel only.

The allocation of broadcast control channels described above should also be taken into account in the definition of other control channels, especially the paging control channel PCH or PPCH. Thus the GPRS mobile station should be capable of indicating to the network, which common control channel, CCCH or PCCCH, it uses to receive paging messages. This can be done in such a manner that the GPRS mobile station which supports the DCCM operating mode indicates its DCCM compatibility separately to the network and the network is on the basis of this information directed to transmit the control messages on the PCCCH channel. If the mobile station provides no indication of DCCM compatibility or of PCCCH compatibility only, the control messages to said mobile station are transmitted by default on the CCCH channel.

Figure 3:
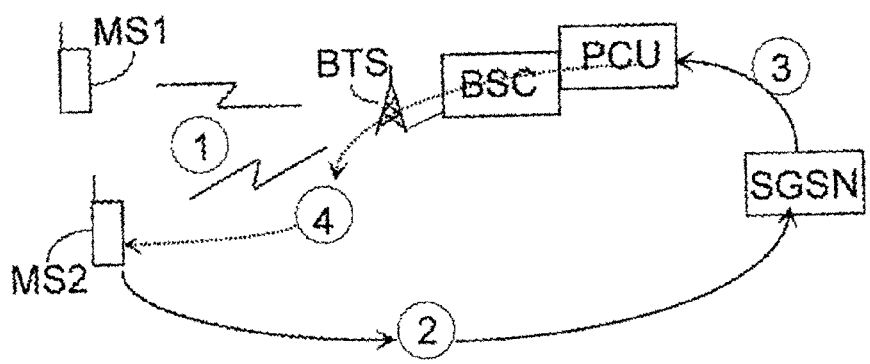
FIG. 3 shows a block diagram of network elements essential for an embodiment of the invention.

According to a preferred embodiment of the invention, the paging channel indication to the network is done by means of the arrangement shown in FIG. 3. FIG. 3 shows only the parts of the GSM/GPRS network of FIG. 1 that are essential to this embodiment. The base transceiver station BTS transmits the SI13 message described above to the mobile stations MS1 and MS2 in the cell (step 1). MS1 does not support the PBCCH/PCCCH channels, so after receiving the SI13 message, it continues to listen to the control channels on the BCCH/CCCH channels. MS2, instead, does support the DCCM operating mode, i.e. in addition to the BCCH/CCCH channels also the PBCCH/PCCCH channels, so it can decode the above-mentioned SI13 message and on the basis of said SI13 message starts to listen to the PBCCH/PCCCH channels. The mobile station MS2 can indicate the DCCM operating mode to the network for instance in an MS RAC (Mobile Station Radio Access Capability) message transmitted in the GPRS Attach process preceding the setting up of a packet data connection, to which message a new field can be attached to indicate the DCCM operating mode. MS2 transmits the MS RAC message indicating the DCCM operating mode to the support node SGSN of said cell (step 2). Thus, this embodiment of the invention preferably utilizes existing signaling processes and no new signaling messages are needed. This way, the signaling load of the network does not preferably increase, either.

As part of the GPRS Attach process, the support node SGSN transmits to the mobile station MS2 a paging message which passes through the radio network elements (PCU, BSC, BTS) to the mobile station MS2. So that the radio network can transmit the paging message on the correct paging channel (either PCH or PPCH), the radio network should have information on which paging channel to use. According to a preferred embodiment of the invention, this can be implemented in such a manner that the support node SGSN attaches the field indicating the DCCM operating mode it received in the MS RAC message to a paging message to be transmitted to the radio network, to be more exact, to the packet control unit PCU (step 3). When the packet control unit has received the correct paging channel, it directs the base station controller BSC and the base transceiver station BTS of said cell to use said paging channel (step 4).

The above indication of the correct paging channel to the radio network (step 3) can alternatively be implemented in such a manner that the support node SGSN transmits a prior-art paging message to the packet control unit PCU, which in response to this requests the paging channel used by the mobile station MS2 from the support node SGSN separately each time, if necessary. This type of action does, however, slow down the transmission of paging messages to mobile stations and increases the signaling load on the Gb interface between the support node SGSN and the packet control unit PCU. A further alternative to this implementation is to transmit all paging messages on both paging channels (PCH and PCCCH), which in turn uses up signaling capacity especially on the air interface Um between the base transceiver station BTS and the mobile station MS.

The DCCM compatibility of a mobile station can according to a preferred embodiment of the invention be indicated to the network by means of the MS RAC message of FIG. 4. The task of the MS RAC message is to transmit to the radio network information on the radio interface properties of the mobile station, which information the network utilizes when defining the radio interface parameters for the mobile station. Now this MS RAC message can be modified in such a manner that it comprises a DCCM operating mode field, which is indicated to the support node SGSN. In FIG. 4, this field is defined by the term 'DCCM PCCCH Capability', but it is clear that any other term can also be used for the field. The field is preferably set to be one bit in length and when the mobile station uses the field to indicate that it can also fetch from the SI13 message described above the description of the PBCCH channel in DCCM cells and go to the PBCCH channel, the value of said bit is set to one. The support node SGSN can then instruct the packet control unit PCU to transmit paging messages on the PCCH channel. Otherwise, the field can preferably be left entirely out from the MS RAC message or the value of the bit of the field can be set to zero. In both cases the support node SGSN can deduce that the mobile station will remain on the CCCH channel and the paging messages will be transmitted on the PCH channel. Thus, to perform DCCM indication, no new messages are preferably needed, but existing signaling and messages can be utilized, and network signaling load is thus not increased. The rest of the content of the MS RAC message is described in greater detail in the document 3GPP TS 24.008, V3.7.0, paragraph 10.5.5.12a "*MS Radio Access Capability*," but this information is not essential per se for the implementation of the invention.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for transmitting connection set-up parameters of a packet data network on broadcast control channels in a telecommunications system, which comprises at least one cell which uses a circuit-switched broadcast/common control channel (BCCH/CCCH) and a packet-switched broadcast/common control channel (PBCCH/PCCCH), and at least one mobile station which supports the packet data network and is configured to listen to at least one of said broadcast/common control channels, comprising transmitting the connection setup parameters of the packet data network to mobile stations in said cell on both said circuit-switched and said packet-switched broadcast control channels in response to the fact that the cell supports the transmission of the connection set-up parameters of the data packet network on both the circuit-switched broadcast control channel and the packet-switched broadcast control channel, transmitting from the mobile station to the packet data network a dual control channel mode (DCCM) indication in response to the fact that said mobile station is capable of receiving control messages on both said common control channels, subsequently to said two transmitting steps, selecting, in response to said DCCM indication, one of said common control channels for transmission of control messages to said mobile station, and directing said telecommunications system to transmit control messages to said mobile station on the selected one of said common control channels.

2. A method as claimed in claim 1, wherein said packet data network is a GPRS system, and said DCCM indication is transmitted from the mobile station to the serving support node of the packet data network in an MS RAC message.

3. A method as claimed in claim 2, further comprising directing the serving support node of said telecommunications system to transmit the control messages to said mobile station which transmitted the DCCM indication on a packet-switched common control channel.

4. A telecommunications system which comprises a packet data network and at least one cell which uses a circuit-switched broadcast control channel (BCCH) and a packet-switched broadcast control channel (PBCCH), and at least one mobile station which supports the packet data network and is configured to listen to at least one of said broadcast control channels, in which telecommunications system the connection set-up parameters of the packet data network are configured to be transmitted on broadcast control channels, wherein the telecommunications system is operative to transmit connection set-up parameters of the packet data network to mobile stations in said cell on both said circuit-switched and said packet-switched broadcast control channels in response to the fact that the cell supports the transmission of the connection set-up parameters of the packet data network on both a circuit-switched broadcast control channel and a packet-switched broadcast control channel, the mobile station is configured to transmit to the packet data network a dual control channel mode (DCCM) indication in response to the fact that said mobile station is capable of receiving control messages on both said common control channels, and subsequently to a transmission of the set-up parameters on both said circuit-switched and said packet-switched broadcast control channels, and in response to said DCCM indication, said telecommunications system is configured to select one of said common control channels for transmission of control messages to said mobile station, and to transmit control messages to said mobile station on the selected one of said common control channels.

5. A telecommunications system as claimed in claim 4, wherein said packet data network is a GPRS system, and said DCCM indication from the mobile station to the packet data network serving support node is configured to be indicated in an MS RAC message.

6. A telecommunications system as claimed in claim 5, wherein the serving support node is configured to direct said telecommunications system to transmit the control messages to said mobile station which transmitted the DCCM indication on a packet-switched common control channel.

7. A mobile station which supports a packet data network and is configured to support broadcast control channel reception on a circuit-switched broadcast/common control channel (BCCH/CCCH) and a packet-switched broadcast/common control channel (PBCCH/PCCCH) and which is configured to listen to at least one of said broadcast/common control channels, the mobile station is configured to decode the connection set-up parameters of the packet data network from a message transmitted by the telecommunications system, in which message the cell of the mobile station indicates that it supports the transmission of the connection set-up parameters of the packet data network on both a circuit-switched broadcast control channel and a packet-switched broadcast control channel, and the mobile station is configured to transmit to the packet data network a dual control channel mode (DCCM) indication in response to the fact that said mobile station is capable of receiving control messages in parallel on both said common control channels, and the mobile station is configured to receive subsequent control messages which the telecommunications system transmits on either one of said common control channels.

8. A mobile station as claimed in claim 7, wherein said packet data network is a GPRS system, and the mobile station is configured to transmit said DCCM indication to the serving support node of the packet data network in an MS RAC message.

* * * * *